United States Patent [19]

Glickman

[11] Patent Number: 4,498,148
[45] Date of Patent: Feb. 5, 1985

[54] COMPARING INPUT WORDS TO A WORD DICTIONARY FOR CORRECT SPELLING

[75] Inventor: David Glickman, Frederick, Md.

[73] Assignee: International Business Machines Corporation, Armonk, N.Y.

[21] Appl. No.: 469,051

[22] Filed: Feb. 23, 1983

Related U.S. Application Data

[63] Continuation-in-part of Ser. No. 160,345, Jun. 17, 1980, abandoned.

[51] Int. Cl.³ .............................................. G06F 15/20
[52] U.S. Cl. ..................................................... 364/900
[58] Field of Search ... 364/200 MS File, 900 MS File

[56] References Cited

U.S. PATENT DOCUMENTS

| | | | |
|---|---|---|---|
| T928,003 | 11/1974 | Bahl et al. | 364/900 X |
| 3,962,539 | 6/1976 | Ehrsam et al. | 364/200 X |
| 3,995,254 | 11/1976 | Rosenbaum | 340/146.3 |
| 4,080,599 | 3/1978 | Conti | 364/900 X |
| 4,168,396 | 9/1979 | Best | 364/200 X |
| 4,256,924 | 3/1981 | Sakoe | 364/513 X |
| 4,383,307 | 5/1983 | Gibson | 364/900 |

OTHER PUBLICATIONS

Giangardella et al., "Spelling Correction by Vector Representation Using a Digital Computer", *IEEE Trans. on Engineering and Speech*, vol. EWS-10, No. 2, Dec. 1967, pp. 57-62.

Creamer, M. K., "High-Speed High-Density Control Store", *IBM T.D.B.*, vol. 18, No. 8, Jan. 1976, pp. 2478-2486.

*Primary Examiner*—Raulfe B. Zache
*Attorney, Agent, or Firm*—John W. Henderson, Jr.

[57] ABSTRACT

A method and apparatus for vectorizing text words for compact storage and spelling verification in a miniprocessor system without the use of complex mathematics functions. A binary storage table contains a plurality of addressable binary numbers. Each character in an input word is converted into a numerical weighting value. The numerical weighting values for the characters in a word are used to index into a magnitude weighting table. The selected magnitude weights are summed to produce a vector magnitude representation for the input word. The numerical weighting values are also used to cumulatively access the binary storage table. The values output from the binary storage table are modulo-2 added and accumulated to produce a vector angle representation for the input word. The calculated magnitude and angle values are used to compactly store a dictionary memory of correctly spelled words. Words subsequently input for spelling verification are similarly converted to vector magnitude and angle representations for comparison to the stored dictionary to determine if the input words are spelled correctly.

7 Claims, 3 Drawing Figures

COMPARING INPUT WORDS TO A WORD DICTIONARY FOR CORRECT SPELLING

This is a continuation-in-part of U.S. application Ser. No. 160,345, filed 17 June 1980, now abandoned.

TECHNICAL FIELD

The invention disclosed herein relates to text processing devices and more particularly to post processing devices for keyboards, character recognition machines, and speech analyzers.

BACKGROUND ART

A threshold problem in post processing of the output stream from a keyboard, character reader, or voice analyzer is presented by the necessity of executing a quick comparison of the output word with a dictionary of acceptable words and generating a signal indicating the presence or absence of a correctly spelled word. An ancillary problem is created by the need to store a dictionary of words large enough to be meaningful and useful while not requiring so much storage space that the system becomes economically unfeasible.

A solution to the latter problem is disclosed in U.S. Pat. No. 3,995,254 entitled "Digital Reference Matrix For Word Verification", issued Nov. 30, 1976, to W. S. Rosenbaum. In the Rosenbaum patent a word vectorization system is disclosed wherein each dictionary word is represented as a vector having a magnitude and unique angle. The magnitudes are used as addresses to access the angles stored in a memory. It was shown that this technique provides a significant reduction in required storage over storing the characters of the same number of dictionary words.

However, implementation of the word vectorization technology described in the Rosenbaum patent in mini-computers has been shown to be of limited value. The reason being that one characteristic of the mini-computer is the lack of complex mathematics function capability such as multiplication, division, square root, logarithms, and trigonometry. Since the word vectorization technology described in the Rosenbaum patent extensively employs these complex mathematics functions, methods for simulating these functions must be utilized. The simulation methods heretofore used have greatly reduced the computing efficiency of the mini-processor.

DISCLOSURE OF INVENTION

The present invention provides a technique for vectorizing dictionary words for spelling verification in a mini-processor system without the use of complex mathematics functions and without greatly degrading system performance. The technique includes converting each character in an input word into a numerical weighting value. The numerical weighting values are used to index into a magnitude weighting table. The indexed magnitude weights are summed to produce a magnitude representation for the word. The numerical weighting values are also used to cumulatively access a binary storage table. The values output from the binary storage table are modulo-2 added (exclusive OR'ed) and accumulated to produce a unique angle representation for the input word. The calculated magnitude and angle values are then used to access a dictionary storage memory to determine if the input word was correctly spelled.

BEST MODE FOR CARRYING OUT THE INVENTION

The digital reference matrix approach to spelling verification disclosed in U.S. Pat. No. 3,995,254 was conceived as a highly efficient, low-storage approach to validating whether a word was spelled, keyed, or read correctly. This approach utilizes vectorization of alpha words into numerical magnitude and angle representations that are mathematically accurate. The present invention offers a simplified alternative to the complex mathematics utilized in U.S. Pat. No. 3,995,254 by generating "pseudo" angles utilizing a hashing apparatus.

The hashing apparatus, in order to provide a useful result, must contain the following properties:

It must be sensitive to each character and the character's placement in the word.

It must be sensitive to letter transpositions in the word.

It must be insensitive to word length being a criterion in determining the actual pseudo angle (i.e., small words can produce large or small pseudo angles as easily as large words can).

It must be insensitive to magnitude size.

Figure 1:
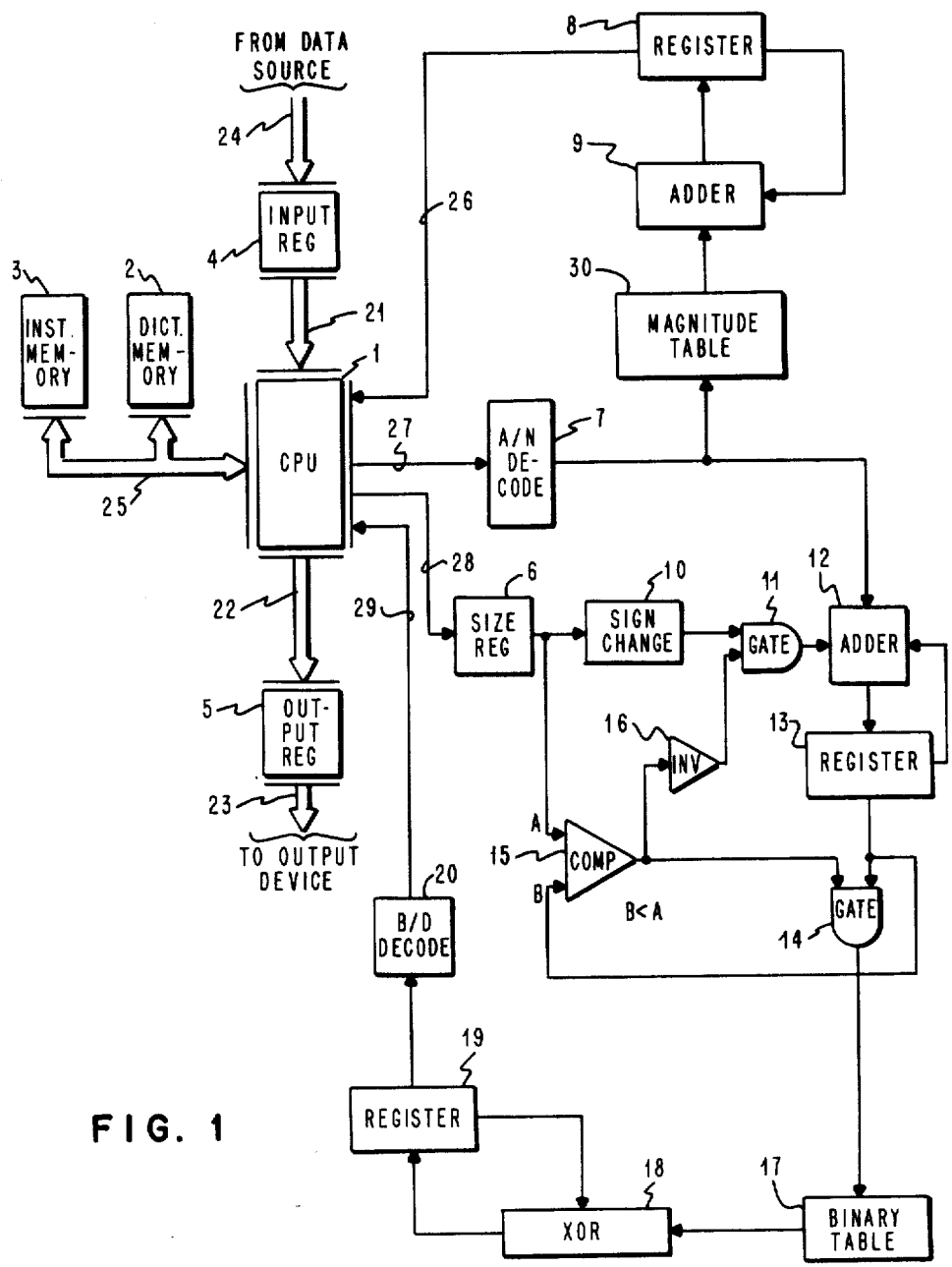
FIG. 1 is a schematic drawing of the word vectorization angle hashing apparatus of the present invention.

Referring now to FIG. 1 there is shown diagrammatically word vectorization angle hashing apparatus of the present invention. The system includes a mini-processor or CPU 1 which may be any well-known mini-processor such as the IBM System 7. The CPU 1 communicates with an input register 4 over input bus 21. The input register 4 communicates over line 24 with an external data source (not shown) such as a keyboard or optical character reader.

The CPU 1 is in two-way communication over bus 25 with an instruction memory 3 and a dictionary memory 2. The instruction memory 3 may be a random access memory or a read only memory containing instructions that control the operation of the CPU 1. The dictionary memory 2, likewise, may be a random access memory or read only memory in which is stored representations of correctly spelled words which are accessed and compared to the input words to verify the spelling of the input words. Words are represented in the dictionary memory 2 as vectors as disclosed in U.S. Pat. No. 3,995,254 where the magnitude component of the vector is used as an address to access the dictionary memory 2 for corresponding angle values. The angle values, however, are pseudo angle values that are generated using a binary hashing table 17 as will be described below. Since the techniques for generating the vectors for storage in the dictionary memory 2 and the technique for generating the vectors for accessing the dictionary memory 2 are identical, only the latter will be described in detail.

A word input to the register 4 for verification of the correctness of its spelling is accessed by the CPU 1 and output on line 27 to an alpha-to-numeric (A/N) decode 7. The A/N decode 7 sequentially converts each alpha character in the word to a corresponding numeric value. For example, the letters A through Z may be converted to numeric values 1 through 26. Additionally, the apostrophe may be included as an acceptable character and converted to the numeric value 27. The numeric values sequentially index into a magnitude storage table 30 to produce a partial magnitude for characters in the word. For example, the numeric value one, representing the letter A accesses the first address in the magnitude table and causes its content to be output to the adder 9. The numerical value two accesses the second address, etc. The numbers stored in the magnitude table 30 may be randomly assigned to the addresses or may be selectively assigned based on the frequency of occurrence of the corresponding alpha characters in the language. The details of a technique for converting alpha characters to numeric representations are disclosed in U.S. Pat. No. 3,995,254 issued Nov. 30 1976, to W. S. Rosenbaum, assigned to the present assignee, and expressly incorporated herein by reference. The magnitude values output from magnitude table 30 are added to adder 9 to the contents of register 8 to accumulate a sum representing the magnitude component for the input word. The numeric values output from the A/N decode 7 are also added by adder 12 to the contents of register 13 to accumulate the angle hashing terms for accessing the binary table 17. The binary table 17 has stored therein a table of 8-bit binary numbers representing a displacement value formed by the partial sums accumulated in register 13. While 8-bit binary numbers are used herein it is understood 12-bit, 16-bit, or other length binary numbers may be selected as well. The binary values stored in table 17 may represent an ascending list of binary numbers beginning with zero and extending to 255. However, the 256 binary numbers that are stored in the table 17 may be stored in a sequence statistically determined by the frequency of occurrence of the different characters in the alphabet and by the relationship of the likelihood that one particular character will precede or follow another character. These statistical relationships will vary from one language to another and will result in a different configuration of the binary words in the table 17 from one language to another. Additionally, the size of the table 17 must take into account the average word length in the language so as to minimize wrap-around as will be described hereafter.

A size register 6 is connected to CPU 1 through line 28 and receives a numerical value representing the number of entries stored in the binary table 17. The number in the size register 6 is input at A to comparator 15 where it is compared to each partial sum in the register 13. As each character value from the A/N decode 7 is accumulated in the register 13 it is gated through gate 14 by the output of the comparator 15 to the binary table 17 as long as the accumulated value in the register 13 is less than the size of the binary table 17. When the accumulated value in the register 13 exceeds the binary table size, the output of the comparator 15 triggers gate 11 through inverter 16 to pass the contents of size register 6 with a negative sign applied at the sign change register 10 to adder 12. The negative value of the contents of the size register 6 is added to the register 13 by adder 12 to effectively subtract the binary table size from the contents of the register 13 and cause wrap-around in the accessing of the binary table 17. Wrap-around means the accessing returns to the start of the binary table 17.

As was previously stated each numerical character value is used to cumulatively access the binary table 17. Each 8-bit output from the binary table 17 is exclusive OR'ed (modulo-2 added) at gate 18 with the contents of the register 19 and stored in the register 19. At the end of the word, the cumulative value is converted from a binary representation to a decimal representation at B/D decode 20 and input to the CPU 1 through line 29. The magnitude component input to the CPU 1 on line 26 and the angle component input to the CPU 1 on line 29 are used to access the dictionary memory 2 for corresponding magnitude and angle components. An exemplary program for controlling the CPU 1 to access the dictionary memory 2 is disclosed in U.S. Pat. No. 4,342,085 filed Jan. 5, 1979, issued July 27, 1982, to David Glickman, et al, assigned to the present assignee and expressly incorporated herein by reference. If corresponding magnitude and angle values are present in the dictionary memory 2 then the CPU 1 will output a signal on line 22 through the output register 5 and to an output device on line 23 to indicate that the word is correctly spelled. If the corresponding magnitude and angle values are not found in the dictionary memory 2, then a signal is output by the CPU 1 indicating that the word is not correctly spelled.

Figure 2:
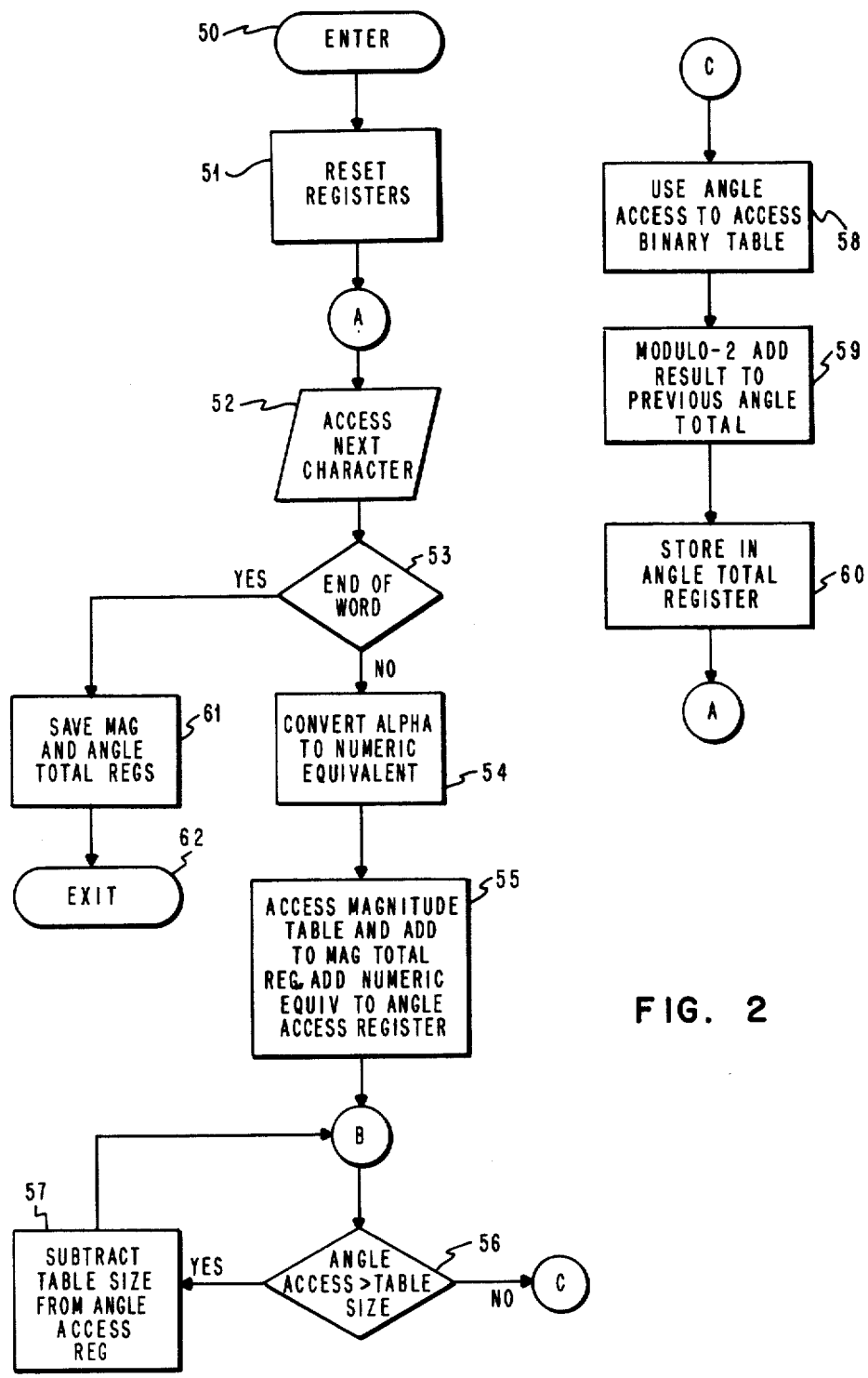
FIG. 2 is a flow diagram of the word vectorization angle hashing technique.

Referring now to FIG. 2 there is shown a flow diagram of the method for generating vector equivalents for input alpha words in accordance with the present invention. This method may be implemented on a general purpose computer as well as with the special purpose circuitry shown in FIG. 1. The routine is entered at block 50 and the storage registers are reset at block 51. At block 52 the next character of the word to be vectorized is accessed. The character is tested at block 53 to determine if it is the end of the word. The end of the word is defined by a character such as a space, tab, carrier return, or punctuation. If the next character is the end of a word, the accumulated magnitude and angle totals are saved at block 61 and the routine is exited at block 62.

When the next character is not the end of a word, the routine branches to block 54 wherein the alpha character is decoded to a predefined numeric equivalent. As was previously stated, the numerical equivalents may be the numbers 1 through 26 to represent alpha characters A through Z, or may be any other numerical values selected. At block 55 the numeric equivalents are used to access the magnitude table and the result is accumulated in the magnitude register. The numeric equivalents are summed in the angle total register. At block 56 the angle total is tested to determine if it exceeds the size of the binary table 17. If the angle total does exceed the binary table 17 size then the table 17 size is subtracted from the angle total at block 57.

When the angle total is less than the binary table 17 size, the angle total is used to access the binary table 17 at block 58. The number output from the binary table 17 is modulo-2 added (exclusive OR'ed) to the previous output total at block 59. The result is stored in a total register at block 60 and a branch is taken back to A to access the next character.

Figure 3:
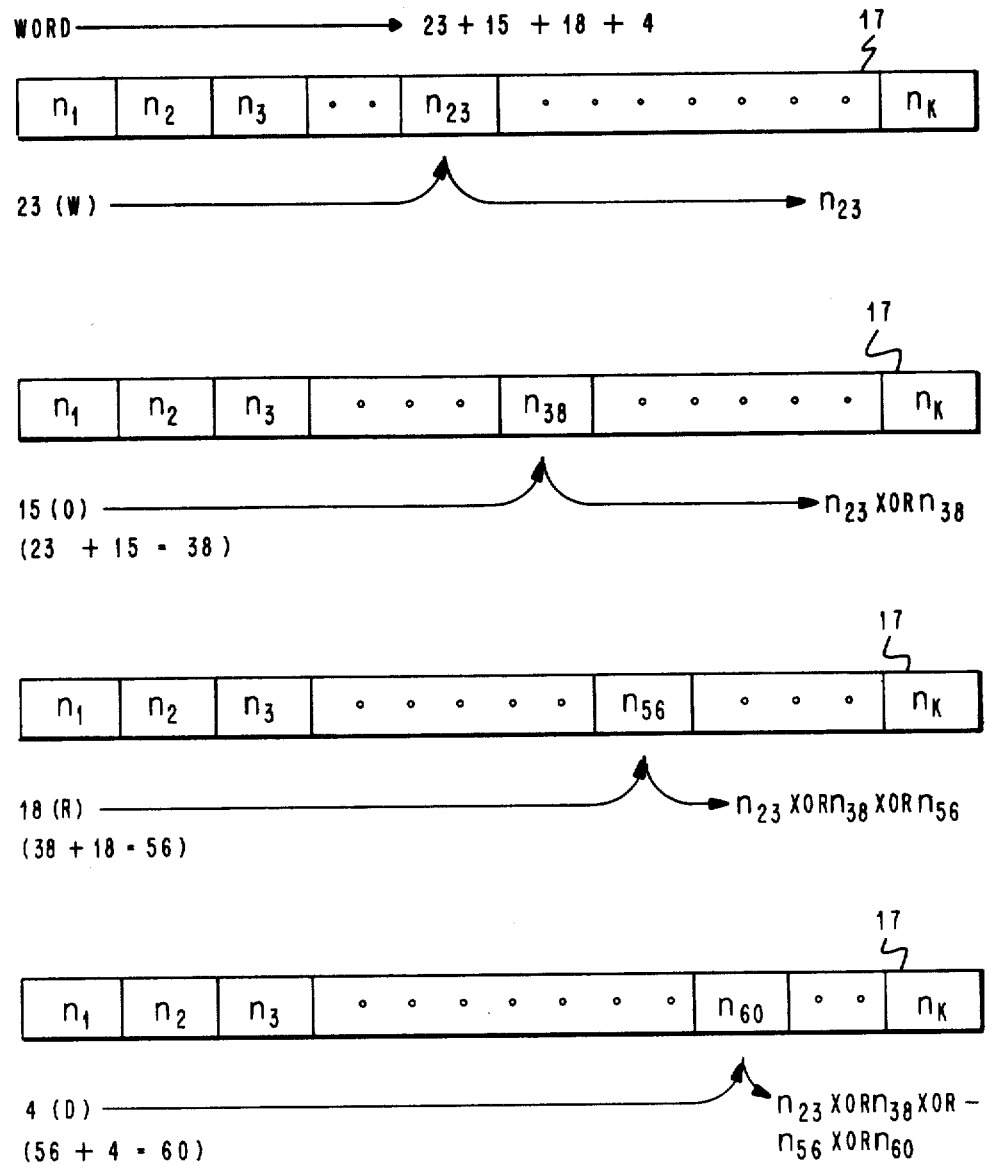
FIG. 3 is an example of the angle hashing calculation of the present invention.

FIG. 3 shows an example of an angle produced for the word "word" using the binary table 17 of the present invention. The characters of "word" are converted to numeric equivalents 23, 15, 18, and 4, respectively. The binary table 17 contains $N_1$ through $N_K$ 8-bit binary numbers which are statistically determined as previously described. W, the 23rd character in the alphabet, accesses the 23rd position, $N_{23}$, in the binary table 17. The next character, O, has a numerical equivalent of 15.

The 15 is added to 23 to produce a sum of 38. This addition takes place in adder 12 and register 13 in FIG. 1. The sum, 38, accesses the 38th position in the binary table 17 and a result is exclusive OR'ed with the previous output from the binary table 17, $N_{23}$, and the result is stored in register 19. The next character in "word" is R which has a numerical equivalent of 18. Eighteen is added to 38 to produce a sum of 56 which accesses the 56th position in the binary table 17. The output, $N_{56}$, is then exclusive OR'ed with the contents of register 19. The fourth character in "word" is D which has a numerical equivalent of 4. Four is added to the previous sum of 56 to produce a sum of 60. The sum 60 is then used to access the 60th position in the binary table 17. The result, $N_{60}$, is then exclusive OR'ed with the previous results stored in register 19 to produce a final binary representation for the angle. The final binary representation for the angle stored in register 19 in FIG. 1 is converted from binary to decimal representation by decode 20 where it is output over line 29 to the CPU 1.

While the invention has been particularly shown and described with reference to the preferred embodiment thereof, it will be understood by those skilled in the art that changes in form and detail may be made without departing from the spirit and scope of the invention.

I claim:

1. In a text processing system including a mini-processor, a memory for storing instructions for controlling said mini-processor, and a dictionary memory for storing a representation for each word of a dictionary of correctly spelled words, apparatus for checking the spelling of input words by comparison to said dictionary of representations of correctly spelled words comprising:
   a source of input words connected to said mini-processor
   decode means connected to said mini-processor for converting each character of an input word into an output numerical representation;
   a magnitude table storage means addressably connected to said decode means for outputting a magnitude value corresponding to each numerical representation output by said decode means;
   a first adder means connected to said magnitude table storage means and said mini-processor for accumulating a magnitude sum of the magnitude values output by said magnitude table storage means and outputting said magnitude sum to said mini-processor for use as an address to access said dictionary memory;
   a second adder means connected to said decode means for accumulating partial sums of said numerical representations output by said decode means;
   binary table storage means connected to said second adder means for storing a plurality of binary numbers addressable to output one of said binary numbers for each partial sum accumulated by said second adder means;
   third adder means connected to said binary table storage means for accumulating a modulo-2 sum of the output of said binary table storage means;
   binary-to-decimal decode means connected to said third adder means and said mini-processor for converting the modulo-2 sum output of said third adder means from a binary number to a decimal angle value and outputting the result to said mini-processor;
   means for comparing said decimal angle value to the contents of said dictionary memory at the accessed address;
   means for indicating said input word is correctly spelled when said compare is equal; and
   means for indicating said input word is not correctly spelled when said compare is unequal.

2. The apparatus of claim 1 wherein said third adder means is an exclusive-OR.

3. In a text processing system including a mini-processor, a memory for storing instructions for controlling said mini-processor, and a dictionary memory for storing a representation for each text word of a dictionary of correctly spelled text words, apparatus for generating representations of input text words for comparison to said dictionary of correctly spelled words comprising:
   a source of input text words;
   decode means connected to said mini-processor for converting each character of an input text word into a numerical representation;
   a magnitude table storage means addressably connected to said decode means for storing a magnitude value corresponding to each numerical representation output by said decode means;
   a first adder means connected to said magnitude table storage means and said mini-processor for accumulating a magnitude sum of the magnitude values output by said magnitude table storage means and outputting said magnitude sum to said mini-processor for use as an address to said dictionary memory;
   a second adder means connected to said decode means for accumulating partial sums of said numerical representations output by said decode means;
   binary table storage means for storing a plurality of binary numbers and addressable to output said binary numbers;
   register means connected to said mini-processor for receiving from said mini-processor and storing a value representing the size of said binary table storage means;
   compare means connected to said second adder means and said register means for comparing each accumulated partial sum to the binary table storage means size value;
   gate means connected to said binary table storage means and said second adder means and operable by said compare means for accessing said binary table storage means at the address equal to said accumulated partial sum for a binary number when the accumulated partial sum is less than said binary table storage means size value;
   third adder means connected to said binary table storage means for accumulating a modulo-2 sum of the binary numbers output by said binary table storage means;
   binary to decimal decode means connected to said third adder means, and said mini-processor for converting the modulo-2 sum output of said third adder means from a binary number to a decimal angle value and outputting the result to said mini-processor;
   means for comparing said decimal angle value to the contents of said dictionary memory at the accessed address;
   means for indicating said input word is correctly spelled when said compare is equal; and means for indicating said input word is not correctly spelled when said compare is unequal.

4. The apparatus of claim 3 wherein said third adder means is an exclusive-OR.

5. The apparatus of claim 3 further including means connected to said second adder means and said register means and responsive to said compare means for subtracting said binary table storage means size value from said accumulated partial sum when said accumulated partial sum exceeds said binary table storage means size value to produce wrap-around of the address for accessing said binary table storage means.

6. A method for checking the spelling of each text word input to a digital computer system, including a mini-processor, by comparison to the contents of a dictionary memory, said method comprising the steps of:

(a) converting each character of an input text word to a numerical representation;
(b) utilizing each said numerical representation to access a magnitude weighting table for a magnitude weight output;
(c) summing the selected magnitude weight outputs to produce a numerical vector magnitude component for the input text word;
(d) sequentially accumulating each said numerical representation to produce a partial sum;
(e) accessing a binary storage device for an output binary number for each produced partial sum;
(f) modulo-2 adding said output binary numbers to produce a modulo-2 sum;
(g) converting the modulo-2 sum to a decimal vector angle component for the input text word;
(h) inputting said vector magnitude and vector angle components in said mini-processor;
(i) addressing said dictionary memory at an address equal to said vector magnitude;
(j) comparing the contents of the dictionary memory at the address to said vector angle;
(k) indicating said input word is correctly spelled when said compare is equal; and
(l) indicating said input word is not correctly spelled when said compare is unequal.

7. The method of claim 6 wherein step (d) further includes the steps of:

sequentially comparing the produced partial sum to a storage limit value for the binary storage device and subtracting said storage limit value from said partial sum when said partial sum exceeds said storage limit value to produce a partial sum less than the storage limit value effectively producing a wrap-around of the accessing of said binary storage device.

* * * * *